United States Patent

[11] 3,543,672

[72] Inventor Anthony L. Payonk
4148 Bridge St., Whitehall, Pennsylvania 18052
[21] Appl. No. 770,665
[22] Filed Oct. 25, 1968
[45] Patented Dec. 1, 1970

[54] SMOKELESS CHARCOAL FIRED GRILL
2 Claims, 7 Drawing Figs.
[52] U.S. Cl. .................................... 99/340, 99/444, 99/448
[51] Int. Cl. .................................... A47j 37/04
[50] Field of Search........................... 99/444, 345, 393, 421, 427, 443, 445, 446, 447—448, 372, 339—340, 376; 126/9, 25

[56] References Cited
UNITED STATES PATENTS

| | | | |
|---|---|---|---|
| 2,891,465 | 6/1959 | Rogge | 99/345 |
| 2,940,381 | 6/1960 | Cottongim et al. | 99/445 |
| 2,985,097 | 5/1961 | Nevin et al. | 99/447 |
| 3,091,170 | 5/1963 | Wilson | 99/427X |
| 3,113,504 | 12/1963 | Reed | 99/421(H)UX |
| 3,182,585 | 5/1965 | Rensch et al. | 99/393X |
| 3,289,571 | 12/1966 | Lewus | 99/446X |
| 3,358,587 | 12/1967 | Hunt et al. | 99/421(H)UX |

Primary Examiner—Walter A. Scheel
Assistant Examiner—Arthur O. Henderson

ABSTRACT: A horizontally disposed sheet metal box having an open top and one end open in which is partly located a cooking oven that rests on a horizontally disposed end member. The aforesaid sheet metal box, which is the body of this invention, is supported at each end by vertically disposed tubular legs. The legs at one end of the body have a laterally disposed axle on each end of which is located a wheel. The aforesaid body of this invention is provided with two angularly disposed and removable burner boxes having a grill top thereon, each box providing a container for the charcoal of this invention. A swingably mounted hood, that is trapezium in shape when viewed from the side, is located on each side and top of the said sheet metal box. One hood is placed over each of the aforesaid burner boxes. Two vertically spaced and parallel grills are mounted within the aforesaid box which has an open bottom under which is located a drip pan adapted to catch the grease or other drippings of whatever is being cooked on this grill.

Patented Dec. 1, 1970
3,543,672
Sheet 1 of 3
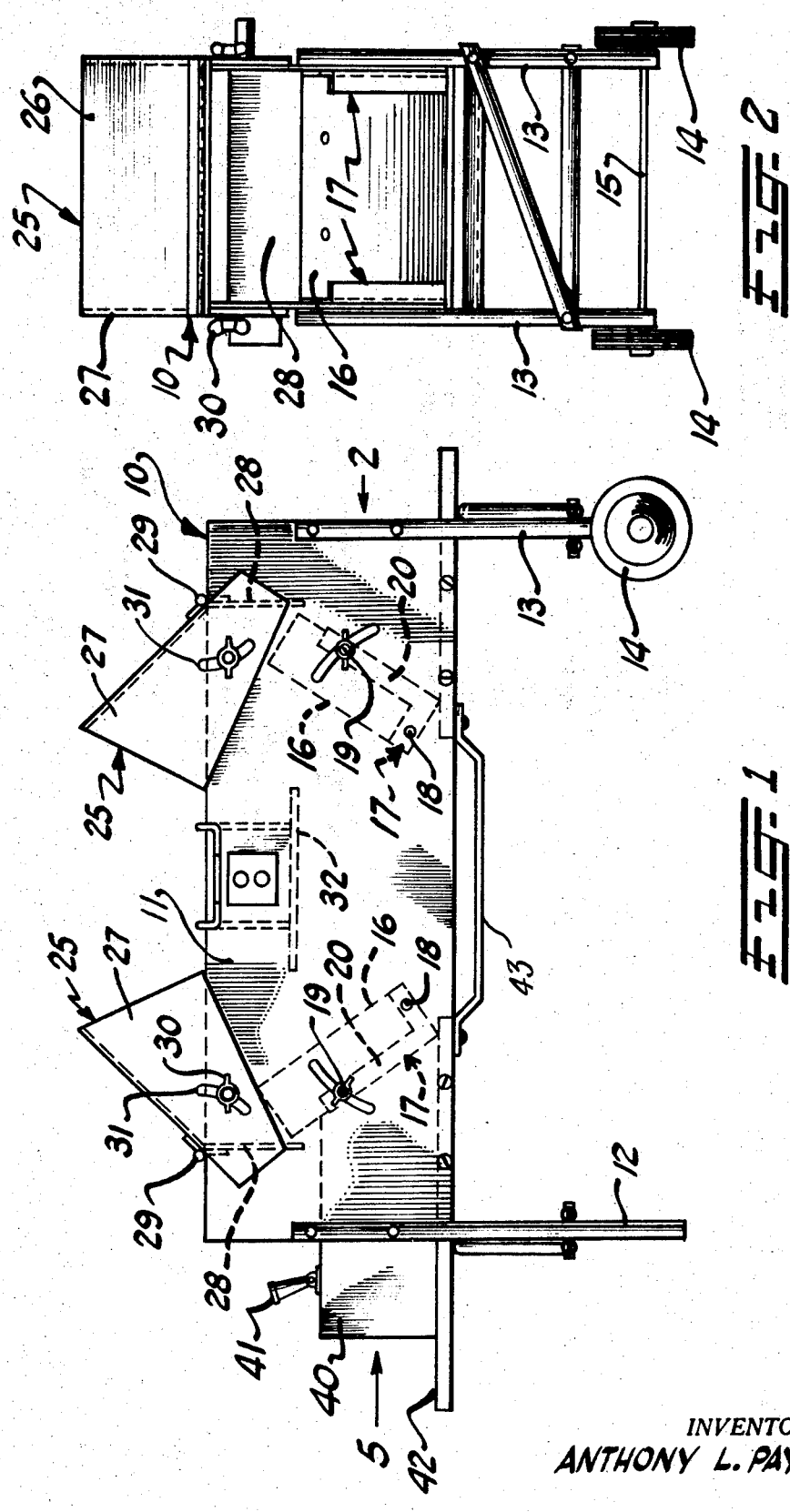
INVENTOR
ANTHONY L. PAYONK

INVENTOR
ANTHONY L. PAYONK

Patented Dec. 1, 1970
3,543,672
Sheet 3 of 3
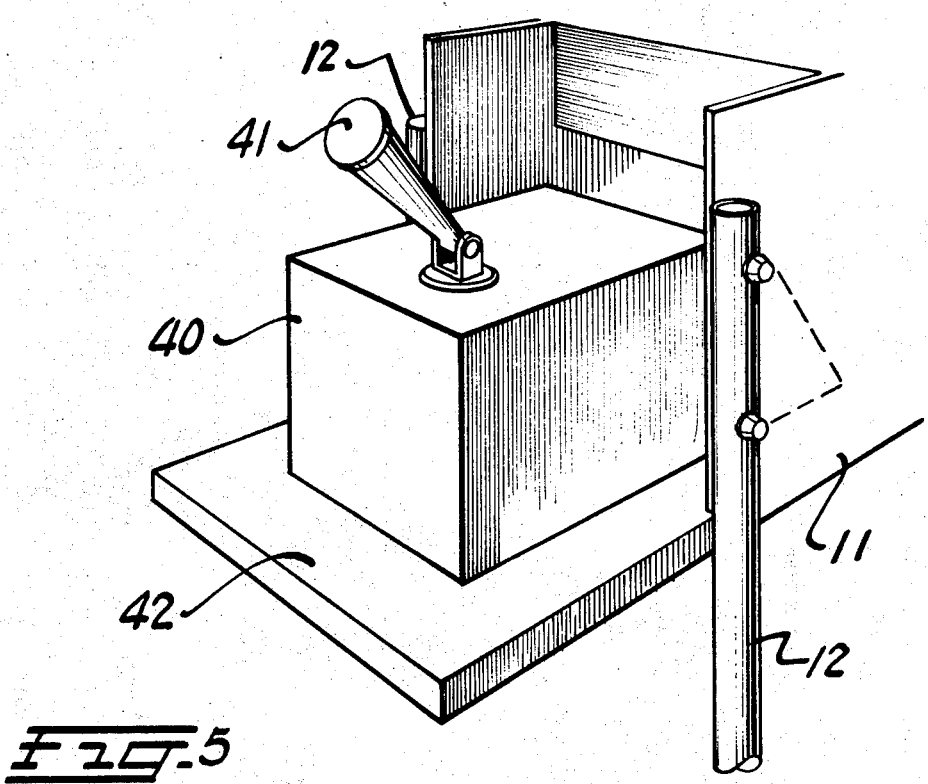
Fig. 5
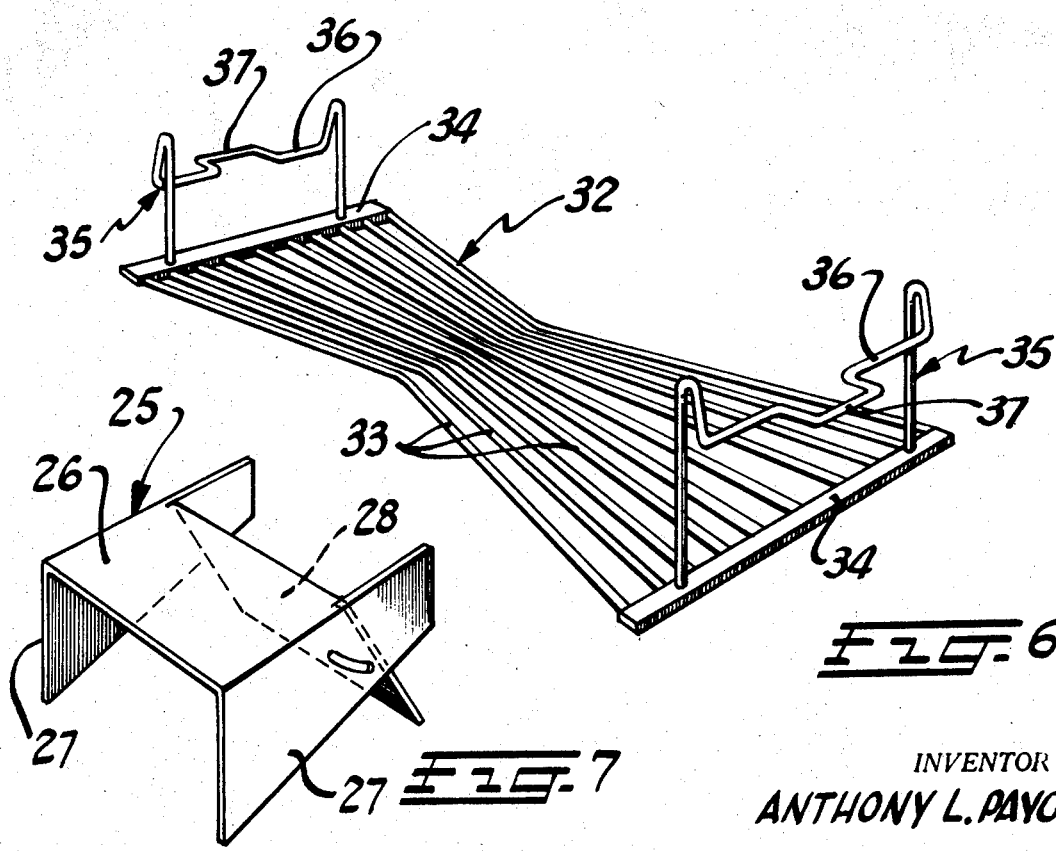
Fig. 6
Fig. 7
INVENTOR
ANTHONY L. PAYONK

3,543,672

SMOKELESS CHARCOAL FIRED GRILL

This invention relates to grills; more particularly, to a grill that is charcoal fired; still more particularly, to a charcoal-fired grill that is smokeless in operation by reason of its unique construction as well be hereinafter described.

It is the principal object of this invention to provide a smokeless charcoal-fired grill, that, as its name implies, is smokeless in its operation, thereby providing a grill that will not cloak its surrounding objects in soot when the grill is being used.

Another object of this invention is to provide a smokeless charcoal-fired grill of the character herein described that has a minimum number of easily accessible parts that can be cleaned in a minimum of time and with little physical effort.

Another object of this invention is to provide a smokeless charcoal-fired grill of the character herein described that can be provided with any desired type of spit.

Still another object of this invention is to provide a smokeless charcoal grill of the character herein described that is provided with wheels for ease in movement of the grill from one place to another.

With the foregoing and other objects in view, as will hereinafter become apparent, this invention provides the construction, combination, and arrangement of parts hereinafter set forth, disclosed and claimed, and illustrated in the accompanying drawings in which:

FIG. 1. is a side view of the this invention;

FIG. 2 is a view of that end of this invention indicated by the horizontally disposed and arrowed line and the numeral 2 in FIG. 1;

FIG. 5 is a pictorial view of a portion of that end of this invention that is indicated by the horizontally disposed arrowed line and numeral 5 in FIG. 1;

FIG. 6 is a pictorial view of the grill portion of this invention; and

FIG. 7 is a pictorial view of one of the two hoods of this invention.

In the accompanying drawings, like parts of this invention are indicated by like reference numerals.

Figure 3:
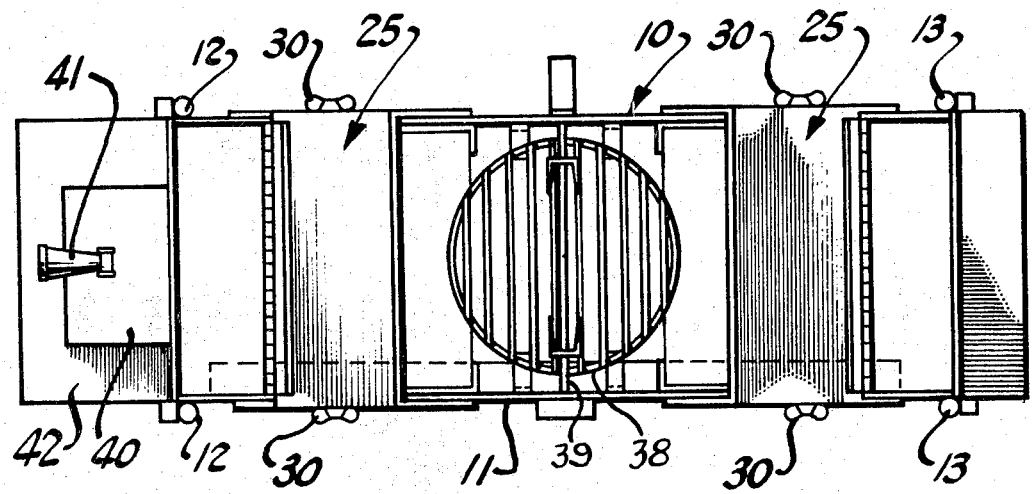
FIG. 3 is a top view of this invention.

The reference numeral 10 indicates this invention in its entirety.

The invention 10 consists of a rectangular horizontally disposed sheet metal box 11 having an oven partly in one end thereof. The aforesaid box 11 is supported a predetermined distance above the ground by two vertically disposed tubular legs 12, these being on one end of the box 11, and two vertically disposed tubular legs 13, these being on the other end of the same box 11. The lower end of the aforesaid legs 13 is supported by the two wheels 14, one wheel of which is on each end of the laterally disposed axle 15, as is clearly shown in FIG. 2 of the drawings.

Figure 4:
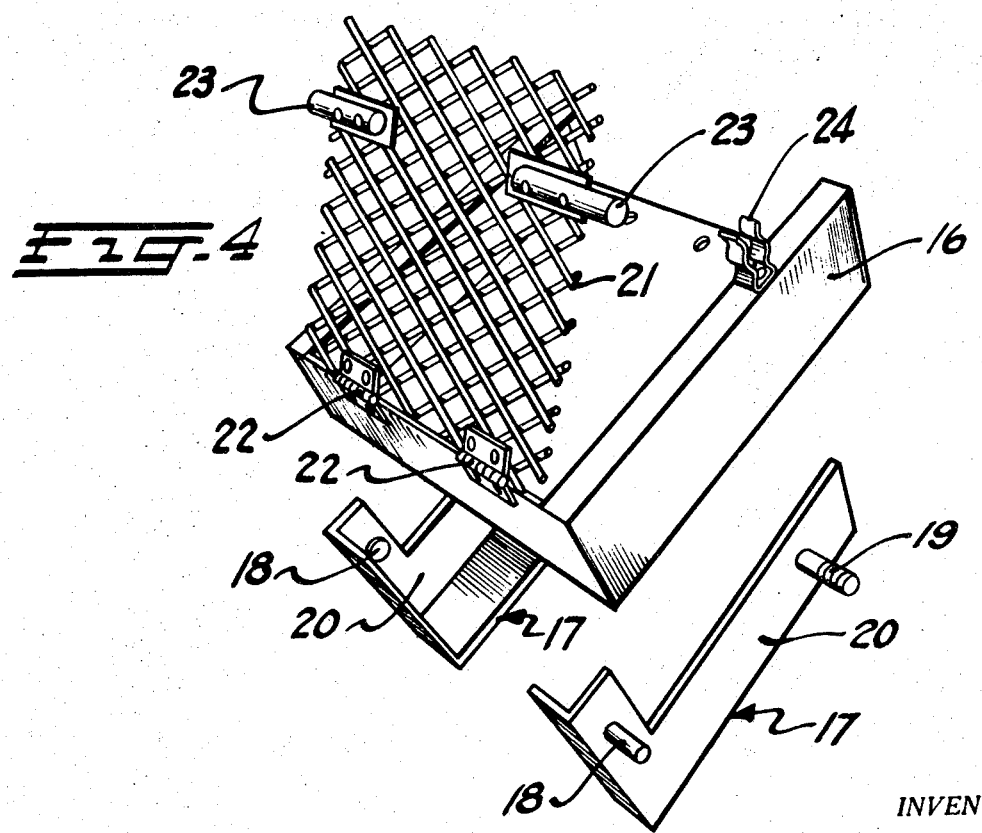
FIG. 4 is an exploded pictorial view of one detail of this invention.

The just-described sheet metal box 11, which is the body of this invention, contains two angularly disposed removable boxes, which I call burner boxes 16. These burner boxes contain charcoal which is lighted to provide heat. Each box rests on two L-shaped swingably mounted supports 17, one support on each side of each burner box 16. Each aforesaid support is fabricated from angle iron and is provided with a hinge pin 18 as well as with a holding stud 19. Each pin and stud projects outward from the side 20 of one of the aforesaid supports 17, as one can see and understand from examination of FIG. 4 of the accompanying drawings.

Each of the two already mentioned burner boxes 16 is made from sheet steel or the like with the exception of the wire grill 21 which is hingedly secured at 22 to the lower end of the aforesaid burner box 16. Each grill 21 is provided with two opposed outwardly extending short bars 23 whose outer end snaps into the holder 24, thereby providing a new and novel means of firmly holding the aforesaid wire grill 21 in place on top of the burner box 16. This construction can be fully understood by examination of FIG. 4 of the accompanying drawings.

Directing ones attention now to FIGS. 1, 2, and 3 of the accompanying drawings, it will be seen that this invention also embodies two hoods 25 that are identical in construction except that one is right-handed and one is left-handed, and that each hood has a side configuration of that of a trapezium, and is made from a single piece of sheet metal that is formed into a top 26 and two parallel end members 27, as one can see on examination of FIG. 7 of the drawings. Here it is also seen that the rear end of the aforesaid top 26 is bent or otherwise formed into a downwardly extending flap 28 that extends down into the aforesaid metal box 11 on which the hoods are hingedly secured by hinges 29 as well as by the wing screws 30 that project through the curved opening 31 in each end 27 of each hood 25, thus permitting each hood to be angularly secured in any desired position on the metal box 11.

Looking now at FIGS. 1 and 6, it will be seen that this invention also has a cooking grill 32 that is made up of a plurality of spaced bars 33 having each end secured to an end bar 34 from which vertically rises a rigid holding wire 35 whose top member 36 is provided with a centrally located horizontally disposed U-shaped member 37. This forms the handles of the aforesaid cooking grill 32 that is held in place by the upper ends of two rigid holding wires 35 fitting over the longitudinal edge of the often mentioned metal box 11. A top grill 38, that is circular in plan form, is mounted in the top longitudinal center of the metal box 11 just above the first mentioned grill 32. This grill 38 is clearly illustrated in FIG. 3 of the accompanying drawing. The aforesaid grill 38 is suitably secured to the metal box 11 by any desired means, such as rod 39, known to those experienced in the art of making cooking devices of this kind. The only other part of this invention that I have not described is the removable rectangular sheet metal cooking oven 40, having a handle 41, on the top thereof. The oven rests on horizontally disposed left end 42 of the aforesaid metal box 11 and partly in the box which is open to receive the oven. The box 11 center portion is provided with a drip pan 43 under the open center portion of the aforesaid metal box or body 11 of this invention.

Minor details of this invention have not been described since they will be understood by those experienced in the art. For the same reason, it is not considered necessary that any explanation need be given in the use of this smokeless charcoal-fired grill since this operation is either well known or can be easily figured out by any person who has ever cooked on a grill of this basic type or who has any mechanical aptitude.

This invention is subject to any and all changes in detail and/or modifications of design that one may care to make in the same in so long as the changes and/or modifications fall within the scope and intent of the appended claims.

I claim:

1. A smokeless charcoal-fired grill of the character described, comprising a sheet metal box supported by legs, two of which rest on an axle having a wheel at each end thereof, the said metal box having two spaced and angularly disposed and adjustable burner boxes for supporting charcoal therein that is lighted to produce a heating fire, each burner box of which is provided with a hinged wire grill top, the said metal box also having two vertically spaced grills on which is placed meat or the like to be cooked over the hot charcoals.

2. The invention of claim 1 wherein the said metal box has one end open in which is slidably located a rectangular sheet metal oven having a handle on the top thereof, the said oven resting on a horizontally disposed flat extension of the bottom and one end of the said metal box.